United States Patent
Matsushita et al.

(10) Patent No.: US 9,403,512 B2
(45) Date of Patent: Aug. 2, 2016

(54) HYDRAULIC BRAKE CONTROL APPARATUS

(75) Inventors: Tatsuya Matsushita, Osaka (JP);
Daisuke Nago, Sakai (JP)

(73) Assignee: SHIMANO INC., Sakai (JP)

( * ) Notice: Subject to any disclaimer, the term of this patent is extended or adjusted under 35 U.S.C. 154(b) by 1390 days.

(21) Appl. No.: 12/535,703

(22) Filed: Aug. 5, 2009

(65) Prior Publication Data

US 2011/0031078 A1    Feb. 10, 2011

(51) Int. Cl.
*B62L 3/02* (2006.01)
*B60T 7/10* (2006.01)
*B60T 11/16* (2006.01)
*B60T 11/18* (2006.01)

(52) U.S. Cl.
CPC ............... *B60T 7/102* (2013.01); *B60T 11/165* (2013.01); *B60T 11/18* (2013.01)

(58) Field of Classification Search
CPC ......... B60T 7/08; B60T 7/102; B60T 11/165; B60T 11/18; B62K 23/02; B62K 23/06; B62L 3/00; B62L 3/02; B62L 3/023
USPC ......... 188/344, 24.11, 24.15, 24.22; 74/502.2
See application file for complete search history.

(56) References Cited

U.S. PATENT DOCUMENTS

| 4,771,649 | A | 9/1988 | Modolo | |
|---|---|---|---|---|
| 7,055,323 | B2 * | 6/2006 | Idei et al. | 60/594 |
| 7,100,751 | B2 * | 9/2006 | Lavezzi | 188/344 |
| 2004/0163897 | A1 * | 8/2004 | Becocci et al. | 188/24.22 |
| 2009/0152063 | A1 * | 6/2009 | Tsai | 188/344 |

FOREIGN PATENT DOCUMENTS

| DE | 29603807 U1 * | 6/1996 |
|---|---|---|
| FR | 59965 | 9/1954 |
| GB | 03651 | 0/1904 |
| GB | 800196 | 8/1958 |
| WO | WO 95/07836 | 3/1995 |

OTHER PUBLICATIONS

Extended European Search Report for corresponding EP Application No. 10000051.2-2425, Aug. 19, 2011.

* cited by examiner

*Primary Examiner* — Robert A Siconolfi
*Assistant Examiner* — Vu Q Nguyen
(74) *Attorney, Agent, or Firm* — Mori & Ward, LLP

(57) ABSTRACT

A hydraulic brake control apparatus including a body portion, a hydraulic brake control mechanism, and a lever portion. The body portion has a first section configured to fit within an interior of a bar opening and a second section configured to be mounted outside of the interior of the bar opening. The hydraulic brake control mechanism includes a hydraulic brake pressure cylinder having a piston chamber therein, where at least a portion of the hydraulic brake control mechanism is housed within the first section of the body portion. The lever portion connected to the body portion and configured to actuate the hydraulic brake control mechanism. The body portion includes a port fluidly connected to the piston chamber by a conduit. The port is provided on the second section in order to allow bleeding of air from within the piston chamber when the body portion is mounted to the bar opening.

12 Claims, 5 Drawing Sheets

HYDRAULIC BRAKE CONTROL APPARATUS

BACKGROUND OF THE INVENTION

1. Field of the Invention

The present invention relates to a hydraulic brake control apparatus, and more particularly to a hydraulic brake control apparatus with a portion embedded in a bar opening of a bicycle handlebar.

2. Discussion of the Background

Hydraulic brake systems have been utilized on bicycles to provide powerful, safe, and stable braking effects. Such hydraulic brake systems can include a brake lever mounted on a handlebar of a bicycle, a disc brake mounted beside a wheel of the bicycle, and a hydraulic tube interconnecting the brake lever and the disc brake. Due to the size and shape of the components of conventional hydraulic brake levers, such brake levers are typically mounted on the handlebar using a bracket affixed to an outer circumference of the handlebar. However, such a mounting configuration may not be ideal, since many of the components of the hydraulic brake lever may be exposed and therefore susceptible to damage or environmental factors.

Accordingly, an improved hydraulic brake lever is desired.

SUMMARY OF THE INVENTION

An embodiment of the present invention advantageously provides a hydraulic brake control apparatus comprising a body portion, a hydraulic brake control mechanism, and a lever portion. The body portion has a first section configured to fit within an interior of a bar opening and a second section configured to be mounted outside of the interior of the bar opening. The hydraulic brake control mechanism includes a hydraulic brake pressure cylinder having a piston chamber therein, where at least a portion of the hydraulic brake control mechanism is housed within the first section of the body portion. The lever portion connected to the body portion and configured to actuate the hydraulic brake control mechanism.

A further embodiment of the present invention further advantageously provides that the body portion includes a port fluidly connected to the piston chamber by a conduit. The port is provided on the second section in order to allow bleeding of air from within the piston chamber when the body portion is mounted to the bar opening.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF EXEMPLARY EMBODIMENTS OF THE INVENTION

Figure 1:
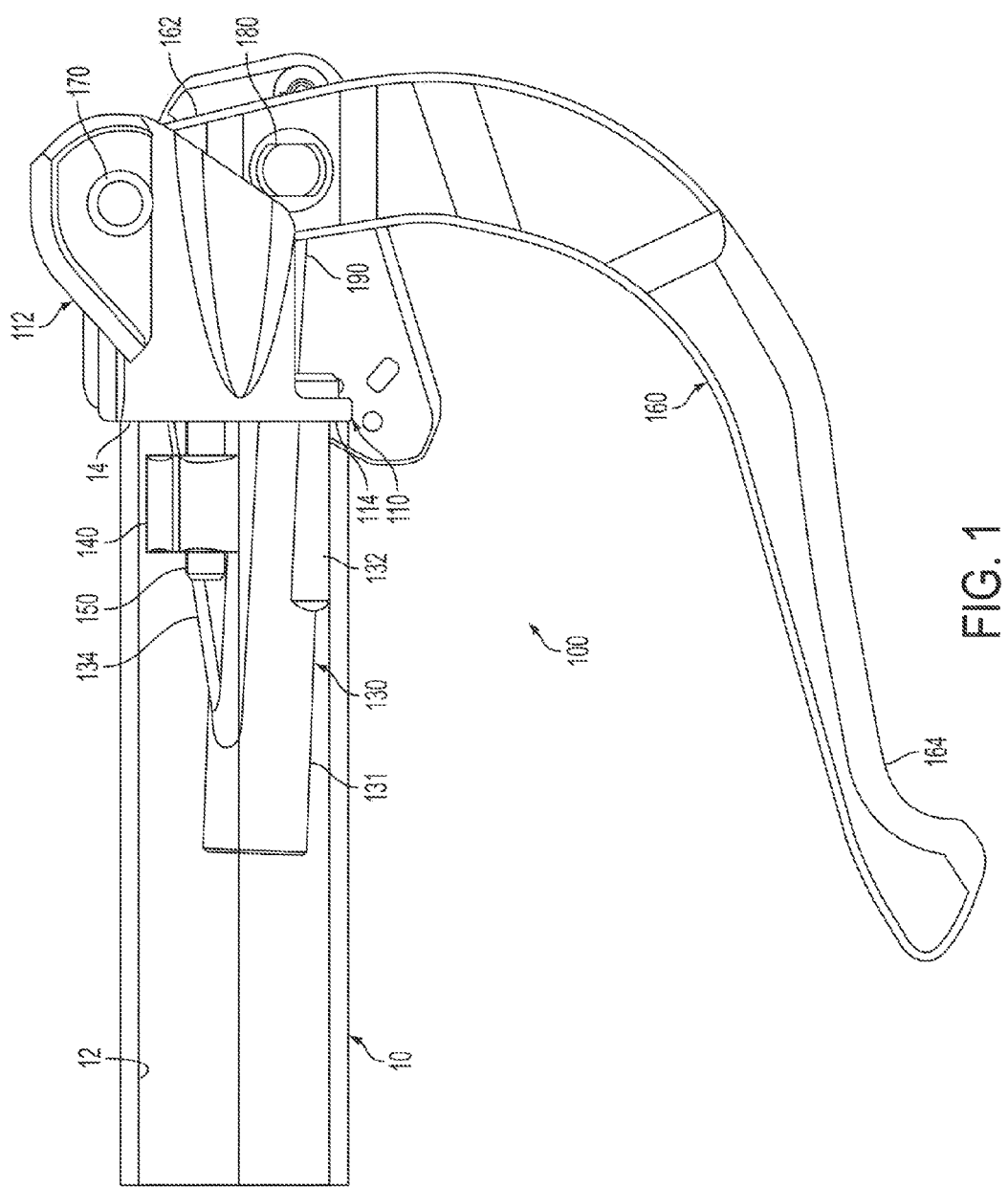
FIG. 1 is a front, elevational view of a hydraulic brake control apparatus including a control lever, which is mounted to a handlebar, according to an embodiment of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

FIG. 1 is a front, elevational view of a hydraulic brake control apparatus including a control lever 100, which is mounted to a handlebar 10, according to an embodiment of the present invention. In FIG. 1, for the sake of simplicity and ease of depiction, the handlebar 10 is shown as being transparent so that components of the hydraulic brake control apparatus that are received within the handlebar 10 can be seen therethrough.

Figure 2:
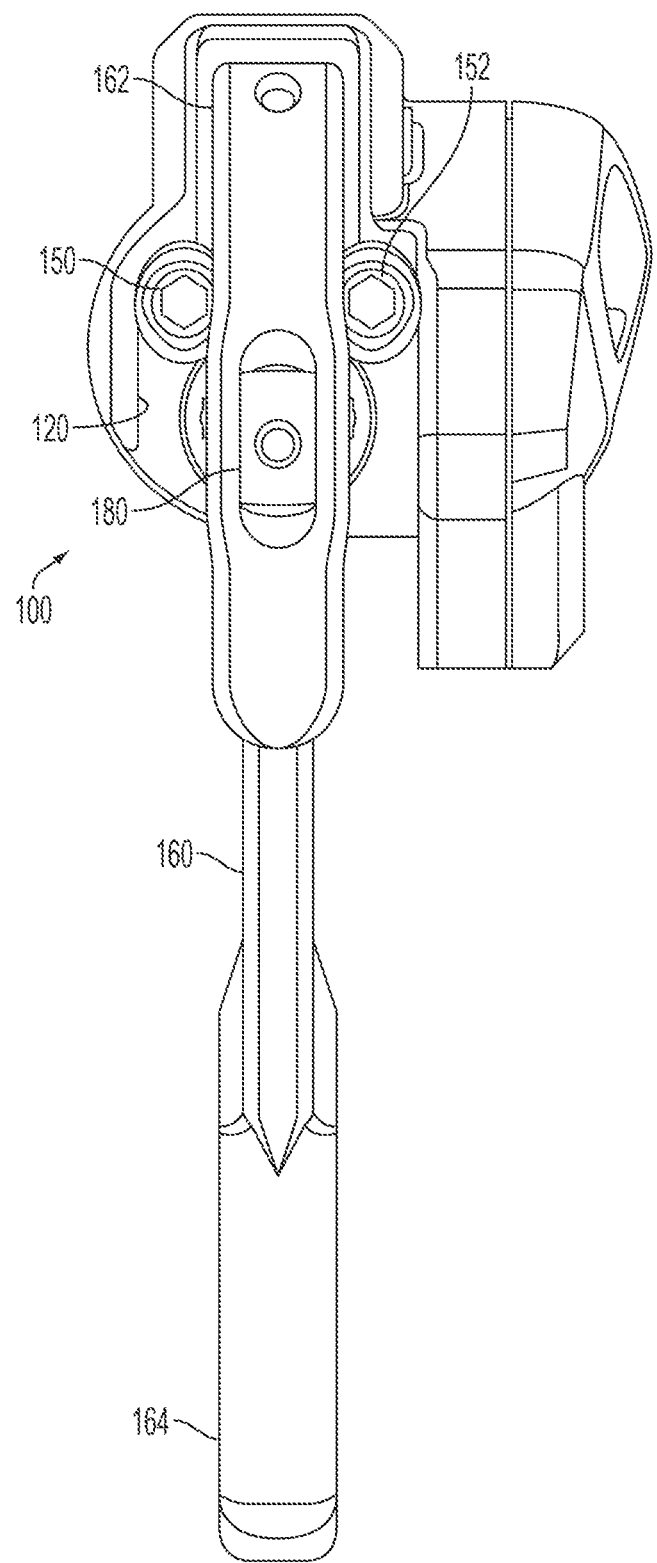
FIG. 2 is a right side elevational view of the hydraulic brake control apparatus including the control lever of FIG. 1.
Figure 3:
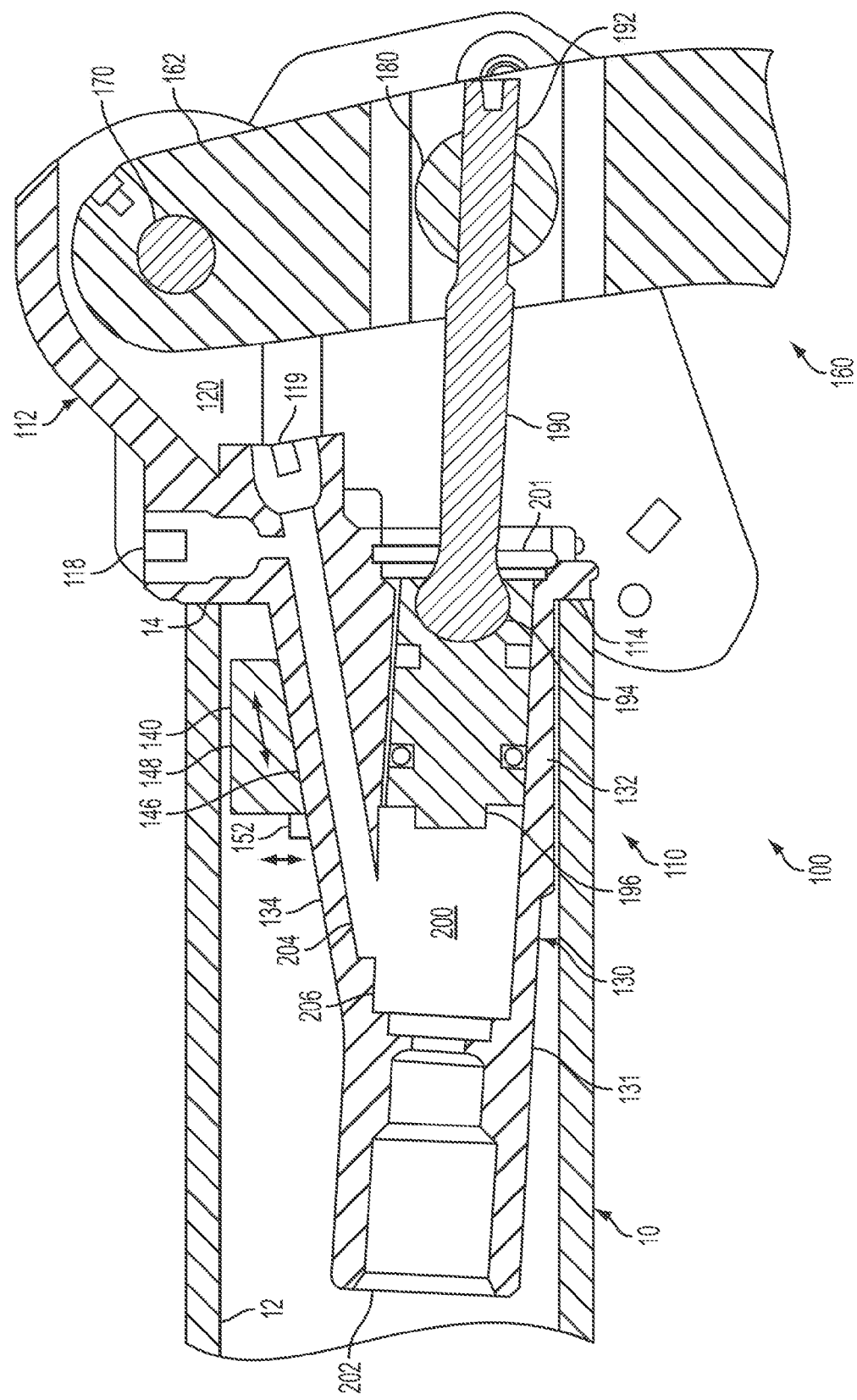
FIG. 3 is a front, partial, cross-sectional view of a hydraulic brake control apparatus including a control lever, which is mounted to a handlebar, according to an embodiment of the present invention.
Figure 4:
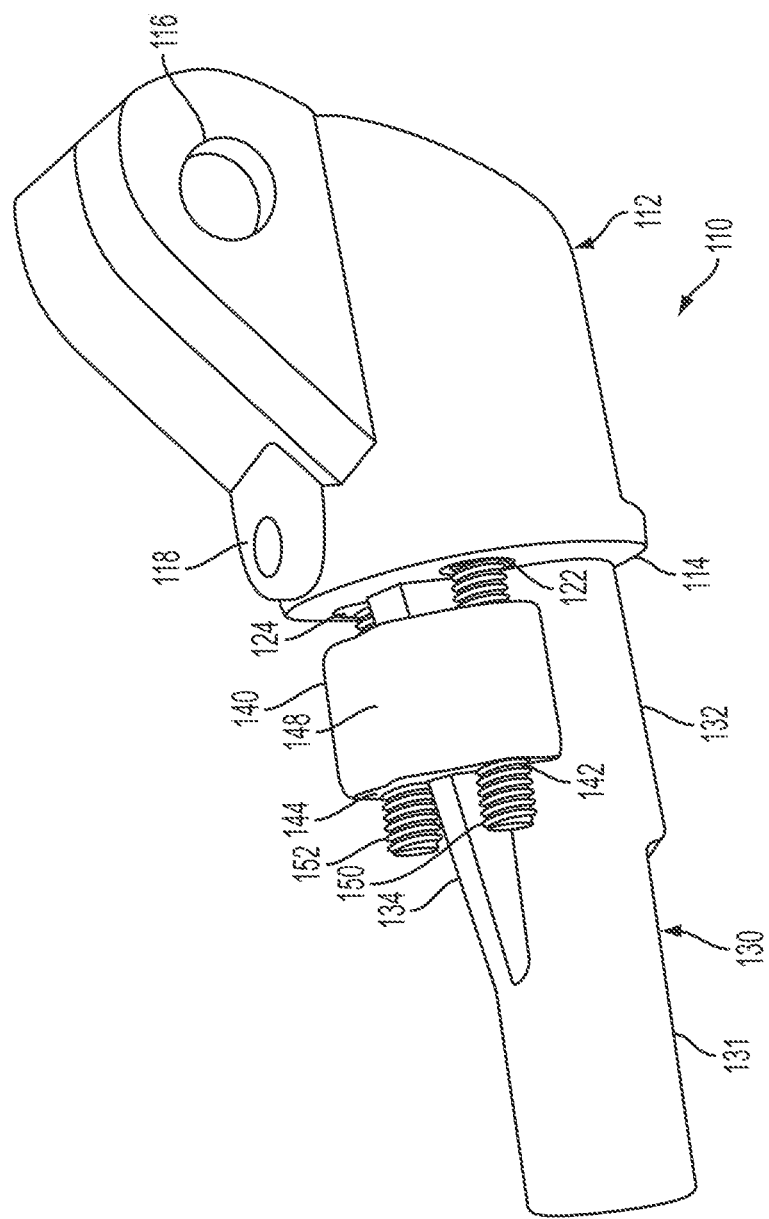
FIG. 4 is a front, top, left perspective view of a body portion of the control lever including a mounting portion and mounting screws, according to an embodiment of the present invention.

FIGS. 1-3 depict a handlebar 10 that is a tubular member having a hollow interior with an inner surface 12 and an open terminal end 14. The handlebar 10 can be, for example, for a bicycle or other vehicle that utilizes such a hydraulic brake control apparatus. The tubular member can have a circular cross-sectional shape, or other non-circular (e.g., oval, square, etc.) cross-sectional shape if desired. The control lever 100 of the hydraulic brake control apparatus is configured to be mounted to the end 14 of the handlebar 10, with at least a portion of the components of the hydraulic brake apparatus received within the hollow interior of the handlebar 10.

The hydraulic brake control apparatus includes a hydraulic brake control mechanism including a hydraulic brake pressure cylinder or master cylinder 131, the operation of which is discussed in greater detail below with respect to FIGS. 3 and 5. The hydraulic brake pressure cylinder 131 and various components thereof are housed within a section 130 of a body portion 110 of the control lever 100, and are actuated by a lever portion 160 of the control lever 100.

Referring to FIGS. 1-5, the control lever 100 includes a body portion 110 having an exterior section 112 that is configured to be outside of the tubular member or bar opening when mounted to the handlebar 10, and the interior section 130 that is configured to fit within the interior of a tubular member or bar opening.

The exterior section 112 of the body portion 110 includes a lip portion 114 that abuts against the end 14 of the handlebar 10 when the control lever 100 is mounted to the handlebar 10. The exterior section 112 includes a hole 116 that extends therethrough that receives an axle 170 that is used to pivotally mount the lever portion 160 to the body portion 110. The exterior section 112 includes openings or ports 118 and 119 that each house a valve that can be used to inject hydraulic fluid into the hydraulic pressure cylinder 131 and/or bleed air out of the hydraulic pressure cylinder 131. The exterior section 112 also includes a recessed portion 120 that receives an upper end 162 of the lever portion 160 for pivotal actuation thereof about the axle 170.

The interior section 130 of the body portion 110 houses the hydraulic brake pressure cylinder 131. The interior section 130 includes a mounting surface 132 on a lower side thereof, and an inclined surface 134 on an outer upper surface thereof. The mounting surface 132 is configured to press against the inner surface 12 of the handlebar 10 when the control lever 100 is mounted on the end 14 of the handlebar 10. The inclined surface 134 is inclined to slant upwards and away from the mounting surface 132 as the inclined surface 134 approaches the exterior section 112.

The control lever 110 includes a mounting portion or mounting block 140 that is connected to the body portion 110 by mounting screws or bolts 150 and 152. The mounting portion 140 has threaded holes 142 and 144 that are threadably engaged to the threaded mounting screws 150 and 152, respectively. The mounting portion 140 has a lower curved surface 146 that is configured to slidably receive or abut the inclined surface 134. The mounting portion 140 has an upper surface 148 that is configured to press against the inner surface 12 of the handlebar 10 when the control lever 100 is mounted on the end 14 of the handlebar 10 and the mounting screws are rotated to draw the mounting portion 140 towards the exterior section 112. The mounting portion has a generally U-shaped configuration; however, is mounted in an inverted manner.

The mounting screws 150 and 152 are inserted through apertures 122 and 124, respectively, in the exterior section 112 of the body portion 110. The mounting screws can be inserted via the recessed portion 120, as can be seen in FIG. 2. The apertures 122 and 124 are configured to receive the mounting screws 150 and 152 such that the mounting screws can move in a direction perpendicular to a longitudinal axis of the mounting screws when the mounting portion 140 slides along the inclined surface 134. For example, the mounting screws 150 and 152 can be mounted such that they pivot about the head thereof, and/or slide upward or downward. The pivoting/sliding of the mounting screws allows the elevation of the screws or the terminal ends of the screws to change upward or downward as the mounting portion 140 slides to the right or the left, respectively, as shown by the arrows in FIG. 3. The mounting screws 150 and 152 are generally provided at a different angle from the hydraulic pressure cylinder 131 and the inclined surface 134 when connected to the mounting portion 140.

The apertures 122 and 124 can provide for such pivoting of the mounting screws 150 and 152, for example, by providing the apertures with a generally truncated cone-shaped cross-section (not shown) when taken along a plane parallel to the cross-sectional plane of FIG. 3, where a narrower end of the truncated cone is on a right side as viewed in the same orientation of FIG. 3 and a wider end of the truncated cone is on a left side. Thus, the heads of the mounting screws 150 and 152 will retain the screws 150 and 152 in connection with the exterior section 112 of the body portion 110 by the narrower end of the truncated cone, and the wider end will allow the terminal ends of the mounting screws to move upward or downward as the mounting portion 140 slides along the inclined surface 134. Alternatively, or in addition to the embodiment described above, the apertures 122 and 124 can provide for movement/pivoting of the mounting screws 150 and 152 by providing the apertures 122 and 124 with a slot shape, for example, a shape having two semi-circular ends connected by two straight sides.

Accordingly, as the mounting screws 150 and 152 are rotated within the apertures 122 and 124, the threads on the mounting screws 150 and 152, which are threadably engaged to the threaded holes 142 and 144 on the mounting portion 140, will act to slide the mounting portion 145 along inclined surface 134. Therefore, in order to tightly mount the control lever 100 to the handlebar 10, the control lever 100 is positioned as shown, for example, in FIG. 3, and then the mounting screws 150 and 152 are rotated in a direction that pulls the mounting portion 140 in a rightward direction towards the exterior section 112 until the upper surface 148 of the mounting portion 140 contacts the inner surface 12 of the handlebar 10. Then, as the mounting screws 150 and 152 are further rotated/tightened, the upper surface 148 of the mounting portion 140, due to interaction between the mounting portion 140 and the inclined surface 134, will push/press against the inner surface 12 of the handlebar and the lower mounting surface 132 will push/press against an opposite side of the inner surface 12 of the handlebar 10 in order to firmly mount the control lever 10 to the handlebar 10.

It is preferable to provide a feature, for example, an expanded portion or pin or other feature at the terminal end of the mounting screws, that prevents the mounting portion from becoming disengaged from the mounting screws.

Alternative embodiments of the control lever can include a configuration in which one mounting screw is utilized. In such a configuration, the mounting portion and/or the inclined surface is/are preferably configured to prevent the ability of the mounting portion to rotate within the interior of the handlebar as the mounting screw is rotated. Further alternative embodiments can be provided in which a channel or groove extends along the upper surface of the inclined surface, and the mounting portion is received within the groove or has a projection that extends within the groove in order to guide the mounting portion along the inclined surface.

As can be seen in FIGS. 1-3, the control lever 100 further includes the lever portion 160. The lever portion 160 has an upper end 162 and a lower end 164. The upper end 162 of the lever portion 160 is pivotally mounted to the exterior section 112 by the axle 170 mounted within hole 116 that extends through the exterior section 112 on both sides of the recessed portion 120. The lower end 164 of the lever portion 160 can be used as a handle by the user to actuate the control mechanism of the hydraulic brake control apparatus by pulling the lower end 164 towards the handlebar 10.

Figure 5:
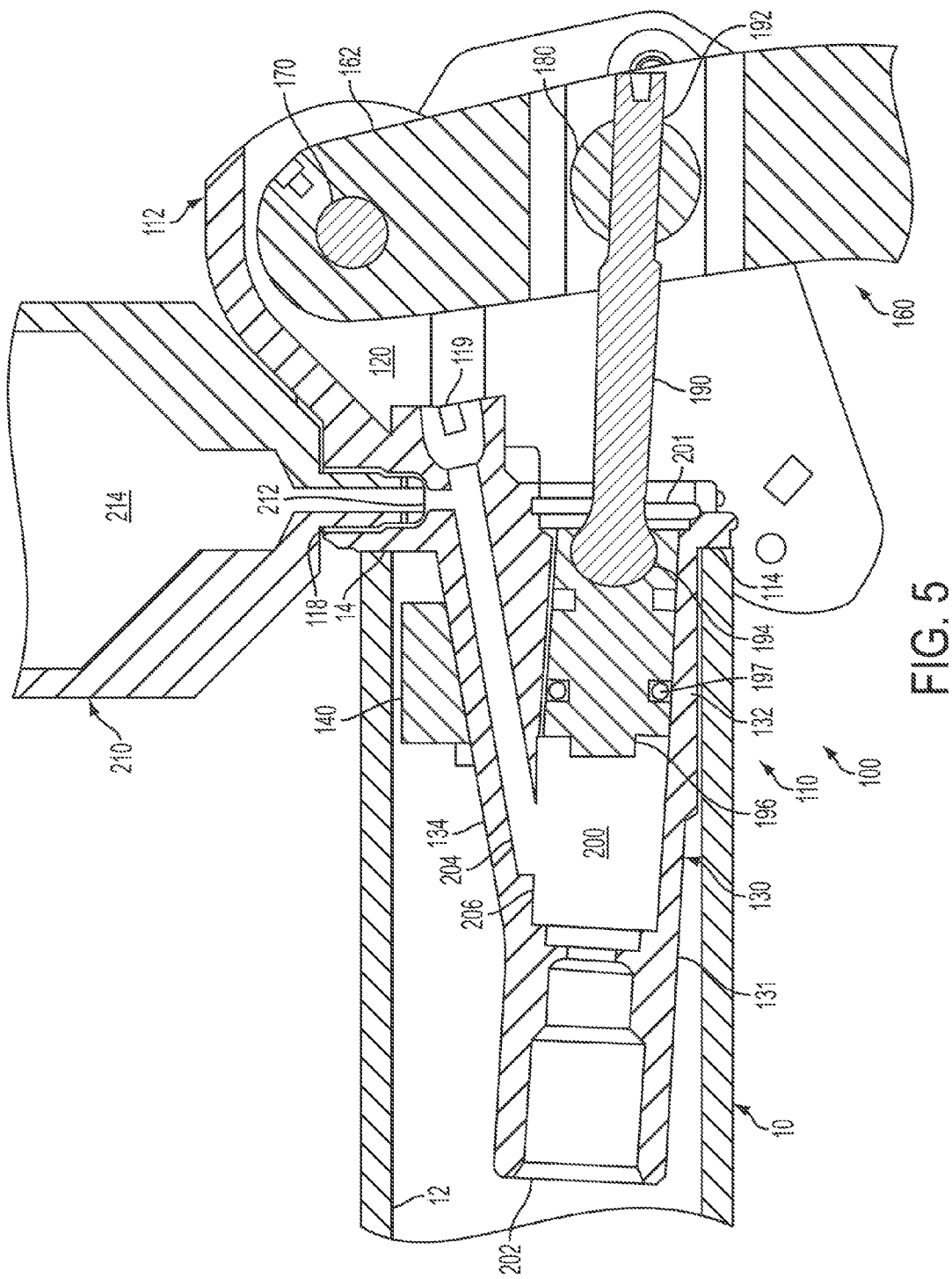
FIG. 5 is a front, partial, cross-sectional view of a hydraulic brake control apparatus including a control lever, which is mounted to a handlebar, where a funnel is used to bleed air from a hydraulic brake pressure cylinder, according to an embodiment of the present invention.

With reference to FIGS. 3 and 5, the hydraulic brake control apparatus includes a hydraulic brake control mechanism including the hydraulic brake pressure cylinder 131. The hydraulic brake pressure cylinder 131 and various components thereof are housed within a section 130 of a body portion 110 of the control lever 100, and are actuated by a lever portion 160 of the control lever 100. At a distance spaced apart from the axle 170, the lever portion 160 is pivotally attached to a push-rod 190 by a pin 180. The pin 180 is fixed to a first end 192 of the push-rod 190, and the pin 180 is configured to pivot with respect to the lever portion 160. A second end 194 of the push-rod 190 is pivotally fixed to a piston 196. The piston 196 has a seal 197 (e.g., an O-ring, etc.) and is slidably provided within a piston chamber 200 of the hydraulic brake pressure cylinder 131. Hydraulic fluid is provided within the chamber 200. A cap 201 is provided on the end of the chamber 200, which allows the push-rod 190 to extend therethrough, but generally seals the components of the hydraulic brake pressure cylinder 131 to surrounding environment conditions.

Therefore, when the lever portion 160 is rotated in a clockwise direction in FIG. 3 about axle 170, the pin 180 will push the push-rod 190 and the piston 196 in a leftward direction within the chamber 200, thereby forcing hydraulic fluid out of port 202. Although not shown in the drawings, port 202 will be connected to a hydraulic tube that will carry the hydraulic fluid to a disc brake mounted beside a wheel of the bicycle in order to actuate the hydraulic brake and apply a braking force to the wheel of the bicycle. Once the user releases the lever portion 160, then the lever portion 160 will rotated in a counterclockwise direction in FIG. 3 about axle 170, and the push-rod 190 and the piston 196 will move in a rightward direction within the chamber 200, thereby releasing the braking force.

The chamber 200 of the hydraulic pressure cylinder 131 has a pipe or conduit 204 that is fluidly connected to the chamber 200 and extends in an inclined direction from the chamber to the openings 118 and 119, which can each house a valve and can be used to inject hydraulic fluid into the hydraulic pressure cylinder 131 and/or bleed air out of the hydraulic pressure cylinder 131. The pipe 204 is connected to an upper or elevated area 206 of the chamber 200.

Embodiments of the present invention advantageously provide a control lever 100 that has a hydraulic pressure cylinder 131 with a chamber 200 therein that is provided at an inclined angle with respect to horizontal when a bicycle to which it is attached is provided in a generally vertical orientation. In other words, the chamber 200 is provided in an inclined manner such that any air or air bubbles within the chamber 200 will collect at the elevated area 206 at the uppermost corner of the chamber 200. The chamber 200 is configured to have an axis along which the piston 196 travels that is at an inclined angle as compared to an axis of the handlebar 10 when the control lever 100 is mounted on the handlebar 10. Additionally, the pipe 204 is connected to the elevated area 206 of the chamber 200 in order to allow air within the chamber to be bled out of the chamber 200, for example, via either opening 118 or opening 119. The pipe 204 is also provided at an inclined angle in order to aid in the bleeding out of air from within the chamber 200.

Embodiments of the present invention advantageously provide a control lever in which such openings 118 and 119 are both provided at locations on the exterior section 112 of the body portion 110, and therefore are accessible when the control lever 100 is mounted to the handlebar 10. Thus, it is possible to perform a bleeding operation when the control lever 100 is attached to the handlebar 10. Notably, the opening 118 provides a further advantageous orientation in that it is also not blocked in any manner by the presence of the lever portion 160 or any other feature of the control lever 100.

As can be seen in FIG. 5, for example, a funnel 210 can be used to perform the bleeding operation via opening 118. The funnel 210 includes a port 212 that is connected to an inner chamber 214 of the funnel. Accordingly, the port 210 can be inserted within the opening 118 in order to perform the bleeding operation. Alternatively, an air bleed nipple can be provided on the opening 118 in order to allow air to be released from the chamber 200.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A hydraulic brake control apparatus comprising:
a body portion having a first section configured to fit within an interior of a bar opening of a handlebar and a second section configured to be mounted outside of the interior of the bar opening;
a hydraulic brake control mechanism including a hydraulic brake pressure cylinder having a piston chamber therein, at least a portion of said hydraulic brake control mechanism being housed within said first section of said body portion; and
a lever portion connected to said body portion and configured to actuate said hydraulic brake control mechanism, wherein said body portion includes a port fluidly connected to said piston chamber by a conduit, said port being provided on said second section of said body portion and said conduit extending into the first section of the body portion within the interior of the bar opening in order to allow bleeding of air from within said piston chamber when said body portion is mounted to the bar opening, said port having an end opening arranged radially and axially outside of the handlebar having the bar opening.

2. The hydraulic brake control apparatus according to claim 1, wherein said piston chamber is provided within said first section.

3. The hydraulic brake control apparatus according to claim 1, wherein said conduit is provided at an inclined angle such that said conduit is inclined as compared to an axis of the bar opening when the body portion is mounted to the bar opening.

4. The hydraulic brake control apparatus according to claim 1, wherein said port is provided on an outer surface of said second section.

5. The hydraulic brake control apparatus according to claim 1, wherein said hydraulic brake control mechanism further includes a piston slidably provided within said piston chamber along an axis thereof.

6. The hydraulic brake control apparatus according to claim 5, wherein said axis of said piston chamber is provided at an inclined angle such that said axis is inclined as compared to an axis of the bar opening when the body portion is mounted to the bar opening.

7. The hydraulic brake control apparatus according to claim 6, wherein said piston chamber has an elevated area at one end thereof, and wherein said conduit is fluidly connected to said piston chamber at said elevated area.

8. The hydraulic brake control apparatus according to claim 1, wherein the body includes an additional port fluidly connected to said piston chamber by the conduit.

9. The hydraulic brake control apparatus according to claim 8, wherein said additional port is provided on said second section of said body portion, said additional port having an end opening arranged axially outside of the handlebar having the bar opening.

10. The hydraulic brake control apparatus according to claim 9, wherein said end opening of said additional port not being arranged radially outside of the handlebar having the bar opening.

11. The hydraulic brake control apparatus according to claim 10, wherein said end opening of said additional port facing said lever portion.

12. A hydraulic brake control apparatus comprising:
a body portion having a first section configured to fit within an interior of a bar opening and a second section configured to be mounted outside of the interior of the bar opening;
a hydraulic brake control mechanism including a hydraulic brake pressure cylinder having a piston chamber therein, at least a portion of said hydraulic brake control mechanism being housed within said first section of said body portion;
a lever portion connected to said body portion and configured to actuate said hydraulic brake control mechanism;
a mounting portion configured to slide on an inclined surface on an outer circumferential surface of said first section; and
at least one mounting screw configured to connect said mounting portion to said body portion, wherein said at least one mounting screw is configured to slide said mounting portion along said inclined surface so as to push said mounting portion and a side of said first section against an inner surface of the bar opening in order to mount said body portion to the bar opening, wherein said at least one mounting screw extends through an aperture in said second section, wherein said at least one mounting screw is threadably engaged to a threaded hole on said mounting portion, and wherein said aperture in said second section is configured to receive said at least one mounting screw such that said at least one mounting screw moves in a direction perpendicular to a longitudinal axis of said at least one mounting screw when said mounting portion slides along said inclined surface.

* * * * *